United States Patent
Xiao et al.

(10) Patent No.: US 9,577,251 B2
(45) Date of Patent: Feb. 21, 2017

(54) ACTIVE ELECTRODE MATERIALS AND METHODS FOR MAKING THE SAME

(71) Applicant: GM Global Technology Operations LLC, Detroit, MI (US)

(72) Inventors: Xingcheng Xiao, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 14/227,289

(22) Filed: Mar. 27, 2014

(65) Prior Publication Data
US 2015/0280219 A1 Oct. 1, 2015

(51) Int. Cl.
| | |
|---|---|
| H01M 4/04 | (2006.01) |
| H01M 4/36 | (2006.01) |
| H01M 4/1395 | (2010.01) |
| H01M 4/38 | (2006.01) |
| H01M 4/46 | (2006.01) |
| H01M 4/62 | (2006.01) |

(52) U.S. Cl.
CPC .......... H01M 4/366 (2013.01); H01M 4/0404 (2013.01); H01M 4/1395 (2013.01); H01M 4/386 (2013.01); H01M 4/387 (2013.01); H01M 4/46 (2013.01); H01M 4/625 (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 7,851,085 B2 | 12/2010 | Obrovac et al. | |
| 8,449,950 B2 | 5/2013 | Shang et al. | |
| 8,580,432 B2 | 11/2013 | Zhamu et al. | |
| 2002/0162606 A1 | 11/2002 | Turner et al. | |
| 2006/0216430 A1* | 9/2006 | Deng ........................ | C23C 4/08 427/456 |
| 2007/0048612 A1 | 3/2007 | Nakajima et al. | |

(Continued)

FOREIGN PATENT DOCUMENTS

| | | |
|---|---|---|
| WO | WO2012/125853 | 9/2012 |
| WO | WO2013/056074 | 4/2013 |

*Primary Examiner* — Scott J Chmielecki
(74) *Attorney, Agent, or Firm* — Dierker & Kavanaugh, P.C.

(57) ABSTRACT

In an example of a method for making a silicon-based active electrode material, a silicon active material precursor is introduced into a carrier gas. Another active material precursor is introduced into the carrier gas prior to, simultaneously with or subsequent to the silicon active material precursor. The other active material precursor is selected from a tin active material precursor, an aluminum active material precursor, a graphene active material precursor, and combinations thereof. The carrier gas containing the precursors is exposed to plasma vaporization, and a material is formed. The material includes i) an alloy of phase separated silicon and tin and/or aluminum, or ii) a graphene layer having silicon nanoparticles and tin nanoparticles, aluminum nanoparticles, or combinations of tin and aluminum nanoparticles deposited on a surface thereof, or iii) a graphene layer having an alloy of phase separated silicon and tin, aluminum, or tin and aluminum deposited on a surface thereof.

17 Claims, 5 Drawing Sheets

(56) References Cited

U.S. PATENT DOCUMENTS

| | | | |
|---|---|---|---|
| 2008/0202288 A1* | 8/2008 | McKechnie | B01J 2/006 |
| | | | 75/346 |
| 2009/0269511 A1* | 10/2009 | Zhamu | B82Y 30/00 |
| | | | 427/558 |
| 2010/0119942 A1 | 5/2010 | Kumar | |
| 2010/0266785 A1* | 10/2010 | Kurachi | C23C 16/513 |
| | | | 427/569 |
| 2013/0071736 A1 | 3/2013 | Xiao et al. | |
| 2013/0344240 A1* | 12/2013 | Godfroid | B65D 65/42 |
| | | | 427/223 |
| 2013/0344392 A1 | 12/2013 | Huang et al. | |
| 2014/0219906 A1* | 8/2014 | Kim | C01B 31/0484 |
| | | | 423/439 |

* cited by examiner

ACTIVE ELECTRODE MATERIALS AND METHODS FOR MAKING THE SAME

BACKGROUND

Secondary, or rechargeable, lithium-sulfur batteries or lithium ion batteries are often used in many stationary and mobile devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a method for making a silicon-based active electrode material, a silicon active material precursor is introduced into a carrier gas. Another active material precursor is introduced into the carrier gas simultaneously with or subsequent to the silicon active material precursor. The other active material precursor is selected from a tin active material precursor, an aluminum active material precursor, a graphene active material precursor, and combinations thereof. The carrier gas containing the precursors is exposed to plasma vaporization, and a material is formed. The material includes i) an alloy of phase separated silicon and tin and/or aluminum, or ii) a graphene layer having silicon nanoparticles and tin nanoparticles, aluminum nanoparticles, or combinations of tin and aluminum nanoparticles deposited on a surface thereof, or iii) a graphene layer having an alloy of phase separated silicon and tin, aluminum, or tin and aluminum deposited on a surface thereof.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted/intercalated into the negative electrode, and during discharging, lithium ions are extracted from the negative electrode. Each of the electrodes is also associated with respective current collectors, which are connected by an interruptible external circuit that allows an electric current to pass between the negative and positive electrodes. Two examples of lithium-based batteries include the lithium-sulfur battery and the lithium ion battery.

The high theoretical capacity of silicon (e.g., 4200 mAh/g) and pure tin (e.g., 994 mAh/g) renders both of these elements desirable for use as a negative electrode (e.g., anode) material in the lithium-sulfur or the lithium ion battery. However, it has been found that negative electrode materials with high specific capacities also have large volume expansion and contraction during charging/discharging. The large volume change experienced by silicon (e.g., from about 300 vol. % to about 400 vol. %) and by tin (e.g., about 360%) during charging/discharging causes the respective materials to fracture, decrepitate, or otherwise mechanically degrade. Such degradation can result in a loss of electrical contact between the active electrode material and its associated current collector, and/or in the creation of new electrode surface which can irreversibly consume the electrolyte to form new solid electrolyte interfaces (SEI). Both of these effects can result in poor life cycling.

The method disclosed herein utilizes plasma vaporization to decompose elemental precursor(s) or reduce graphene precursors to form a desirable active electrode material. These active electrode materials combine silicon with tin, aluminum, and/or carbon, which combinations improve the overall specific capacity of the material. Depending upon the precursors used, a number of different active electrode materials may be formed. As one example, the material is an alloy having phase separated silicon and tin and/or aluminum. As another example, the material is a graphene layer having at least silicon nanoparticles on a surface and/or edge thereof. As yet another example, the material is a graphene layer having a layer of the phase separated alloy formed thereon. In any of the examples, the plasma vaporization process creates silicon nuclei, which grow into nano-sized particles (e.g., on graphene) or nano-sized clusters of amorphous silicon (in the phase separated alloy). In some instances, micron-sized particles or clusters may also be formed. It is believed that nano-sized silicon at least reduces the formation of cracks due to repeated cycling. The materials disclosed herein, or electrodes formed from the materials, also exhibit a porosity ranging from about 40% to about 60% (without the use of a calendering process), which is suitable to accommodate volume expansion during discharge/charge cycles.

Figure 1:
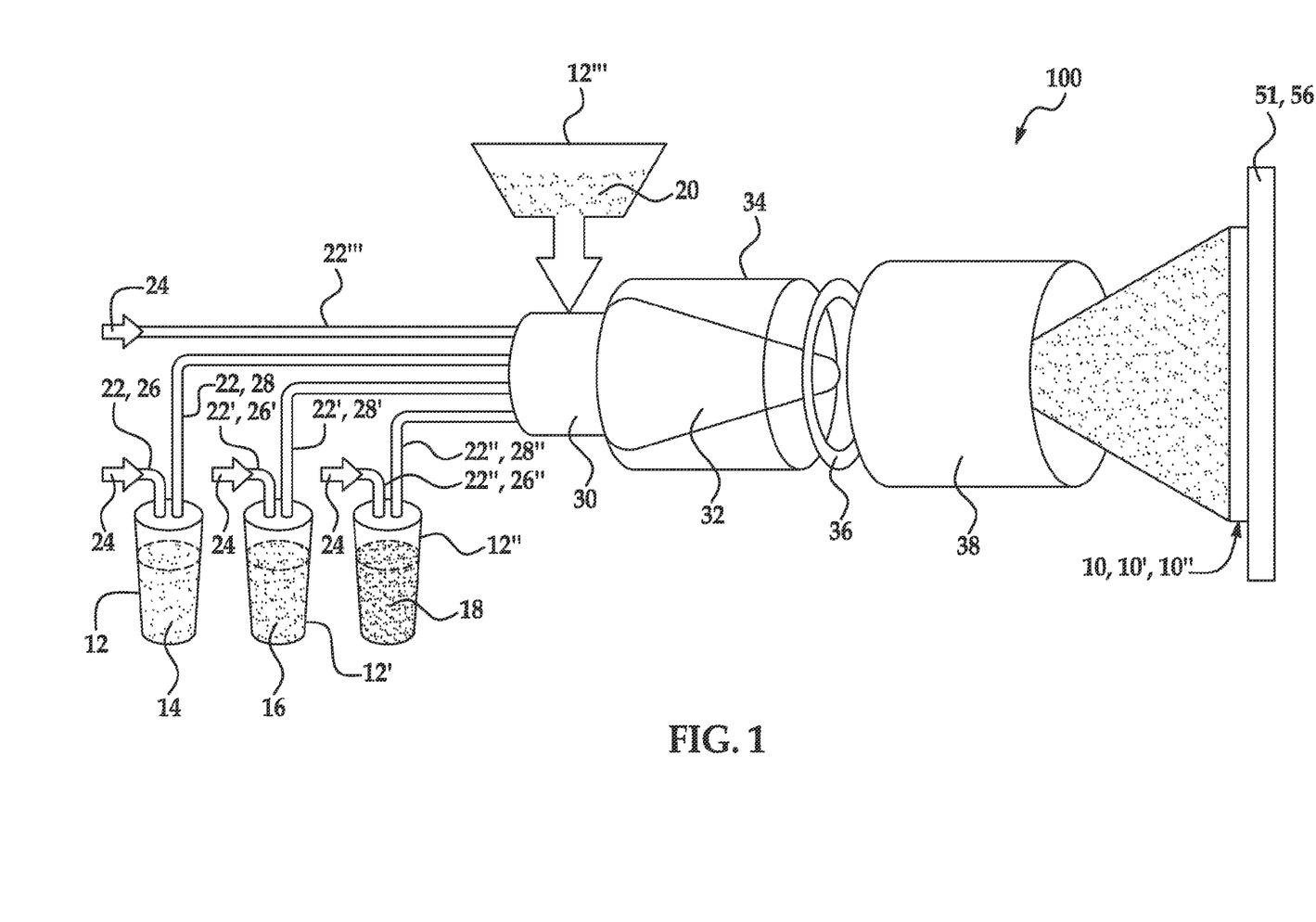
FIG. 1 is a schematic, perspective, partially exploded view of an example of a system for performing an example of a method for preparing examples of the active electrode material disclosed herein.

Referring now to FIG. 1, an example of a system 100 for forming various examples of the active electrode material 10, 10', 10'' is depicted.

The system 100 includes a precursor feed system which is used to store and deliver the various active material precursors for plasma vaporization. The precursor feed system includes various containers 12, 12', 12'', 12''' for storing a silicon active material precursor 14, a tin active material precursor 16, an aluminum active material precursor 18, and/or a graphene active material precursor 20.

Examples of the silicon active material precursors 14 include 2,4,6,8,10-pentamethylcyclopentasiloxane ($CH_3SiHO)_5$, pentamethyldisilane $(CH_3)_3SiSi(CH_3)_2H$, silicon tetrabromide ($SiBr_4$), silicon tetrachloride ($SiCl_4$), tetraethylsilane $Si(C_2H_5)_4$, 2,4,6,8-tetramethylcyclotetrasiloxane ($HSiCH_3O)_4$, and combinations thereof.

Examples of the tin active material precursor 16 include Bis[bis(trimethylsilyl)amino]tin(II) ($[[(CH_3)_3Si]_2N]_2Sn$), Dibutyldiphenyltin ($[CH_3(CH_3)_3]_2Sn(C_6H_5)_2$), Hexaphenylditin(IV) ($[(C_6H_5)_3Sn]_2$), Tetraallyltin (($H_2C{=}CHCH_2)_4Sn$), Tetrakis(diethylamido)tin(IV) ($[(C_2H_5)_2N]_4Sn$), Tetrakis(dimethylamido)tin(IV) ($[(CH_3)_2N]_4Sn$), Tetramethyltin ($Sn(CH_3)_4$), Tetravinyltin ($Sn(CH{=}CH_2)_4$), Tin(II) acetylacetonate ($C_{10}H_{14}O_4Sn$), Tricyclohexyltin hydride (($C_6H_{11})_3SnH$), Trimethyl(phenylethynyl)tin ($C_6H_5C{\equiv}CSn(CH_3)_3$), Trimethyl(phenyl)tin ($C_6H_5Sn(CH_3)_3$), tin chloride ($SnCl_4$), and combinations thereof.

Examples of the aluminum active material precursor 18 include Aluminum tris(2,2,6,6-tetramethyl-3,5-heptanedionate) ($Al(OCC(CH_3)_3CHCOC(CH_3)_3)_3$), Triisobutylaluminum ($[(CH_3)_2CHCH_2]_3Al$), Trimethylaluminum (($CH_3)_3Al$), Tris(dimethylamido)aluminum(III) ($Al(N(CH_3)_2)_3$), and combinations thereof.

Examples of the graphene material precursor 20 include graphene powder, graphene oxide, and combinations thereof.

The container 12''' storing the graphene material precursor 20 is operatively connected to a plasma chamber 30 (which is a combustion chamber of the plasma flame 32). A feedstock of the graphene material precursor 20 may be delivered directly to the plasma chamber 30, where it can be mixed with a carrier gas 24 prior to delivery to a plasma flame 32.

The containers 12, 12', 12'' storing the respective precursors 14, 16, 18 are operatively and fluidly connected to a carrier gas delivery system. The carrier gas 24 is directed through the carrier gas delivery system in order to ultimately deliver the precursors 14, 16, 18, 20 to the plasma flame 32. Examples of suitable carrier gases 24 include argon (Ar), hydrogen gas ($H_2$), helium (He), nitrogen ($N_2$), carbon monoxide (CO), or combinations thereof.

The carrier gas delivery system includes respective gas delivery mechanisms 22, 22', 22'', 22'''. Each of the gas delivery mechanisms 22, 22', 22'', 22''' is capable of containing the carrier gas 24 therein and flowing the carrier gas 24 therethrough. The gas delivery mechanisms 22, 22', 22'', 22''' may be any suitable polymeric, glass, stainless, steel, copper, or other type of tubing.

The gas delivery mechanisms 22, 22', 22'' include respective inlet conduits 26, 26', 26'' and outlet conduits 28, 28', 28''. The inlet conduits 26, 26', 26'' are respectively attached to a gas source (not shown). As an example, the gas source may be a compressed gas cylinder with a regulator and/or mass flow meter to control the flow rate. The inlet conduits 26, 26', 26'' deliver the carrier gas 24 from the gas source to the containers 12, 12', 12''. The carrier gas 24 that is introduced into the containers 12, 12', 12'', where it picks up the respective active material precursor 14, 16, 18. The resulting mixed stream of carrier gas 24 and active material precursor 14, 16, 18 is carried out of the respective containers 12, 12', 12'' through the outlet conduits 28, 28', 28''. The outlet conduits 28, 28', 28'' deliver the mixed stream of carrier gas 24 and active material precursor 14, 16, 18 from the containers 12, 12', 12'' to the plasma chamber 30.

The gas delivery mechanism 22''' includes a single conduit (e.g., tube) connecting the gas source directly to the plasma chamber 30. This gas delivery mechanism 22''' may be used to deliver the carrier gas 24 directly to the plasma chamber 30, without picking up any precursors 14, 16, 18. The carrier gas 24 delivered through gas delivery mechanism 22''' may be combined with, for example, the graphene active material precursor 20 introduced from container 12'''. The use of gas delivery mechanism 22''' may be desirable when first forming a graphene layer (as will be discussed below in reference to FIG. 2C).

It is to be understood that the stream(s) of carrier gas 24 is/are transported as a result of pressure from the gas source.

As illustrated in FIG. 1, the system 100 includes the previously mentioned plasma chamber 30 and plasma flame 32 (generated in a plasma vaporization chamber 34), as well as a quenching area 36, and a cooling train 38.

The plasma chamber 30 may create the plasma flame 32 using gas (e.g., Ar, He, CO, $N_2$, $H_2$, and combinations thereof) and microwave, direct current (DC), alternating current (AC), or radio frequency (RF).

The carrier gas delivery system delivers one or more of the precursors 14, 16, 18, 20 as a fine gas-based stream into the plasma chamber 30, where it is directed into the plasma flame 32. When the silicon, tin, and/or aluminum active material precursors 14, 16, 18 are used, these precursors 14, 16, 18 are decomposed in the plasma flame 32 into vapors that include the respective elements (i.e., Si, Sn, and/or Al). When graphene oxide is used as the graphene active material precursor 20, this precursor 20 is reduced in the plasma flame 32 into graphene. The graphene oxide may be reduced as a result of the plasma temperature and/or as a result of H' in the plasma flame 32 (e.g., when $H_2$ is used as the carrier gas 24). The resulting graphene is in the form of a two-dimensional layer. When graphene powder is used as the graphene active material precursor 20, the graphene is directly used as a substrate for the deposition of the silicon-based alloys disclosed herein, without reduction or decomposition of the precursor 20. The use of graphene powder as the active material precursor may be desirable when forming the material 10'' shown in FIG. 2C.

The temperature of the plasma vaporization chamber 34 may be controlled by controlling the temperature of the plasma flame 32. The temperature of the plasma flame 32 may be controlled by altering/adjusting the power coupled into the plasma vaporization chamber 34 by the microwave, direct current (DC), alternating current (AC), or radio frequency (RF). In an example, the temperature of the plasma flame 32 ranges from about 500° C. to about 5000° C., and the temperature of the plasma vaporization chamber 34 ranges from about 300° C. to about 1000° C. The plasma flame temperature ranging from about 500° C. to about 5000° C. may be particularly suitable when forming examples of the alloy disclosed herein. A plasma flame temperature ranging from about 500° C. to about 2000° C.

may be more suitable when forming the examples of the graphene layer disclosed herein.

The plasma flame 32 accelerates the vapor(s) that include the respective elements (i.e., Si, Sn, and/or Al) and/or the graphene into the quenching area 36 and then into the cooling train 38. At the quenching area 36 and within the cooling train 38, the vapor(s) that include the respective elements (i.e., Si, Sn, and/or Al) and/or the graphene are exposed to a much lower temperature than the plasma flame temperature. This lower temperature may be at or less than ambient or room temperature (e.g., less than 22° C.).

At the lower temperature, various processes may occur. The process(es) depend upon the precursors 14, 16, 18, 20 that are utilized, and may form one of the example materials 10, 10', 10" disclosed herein. Each of these processes and the resulting material 10, 10', 10" will now be described.

When the silicon active material precursor 14 and the graphene active material precursor 20 are utilized, the silicon active material precursor 14 may be introduced into the carrier gas 24. The mixed steam of carrier gas and silicon active material precursor 14 is then delivered to the plasma chamber 30, where the graphene active material precursor 20 is introduced into the mixed stream. In an example, a ratio of the silicon active material precursor 14 to the graphene active material precursor 20 ranges from about 4:1 to about 1:1.

When exposed to the plasma flame 32, vapor(s) with elemental silicon and graphene will be formed from the respective precursors 14, 20. Then when exposed to the lower temperature at the quenching area 36 and within the cooling train 38, the elemental silicon will deposit onto the surface(s) and/or edge(s) of the graphene. The silicon tends to form Si—C bonds with the graphene surface(s) and/or edge(s). The elemental silicon deposited on the graphene act as nuclei that spontaneously grow into nanoparticles. Generally, the nanoparticles have an average size ranging from about 1 nm to about 100 nm. This example of the method forms the material 10, which is depicted in FIG. 2A.

Figure 2A:
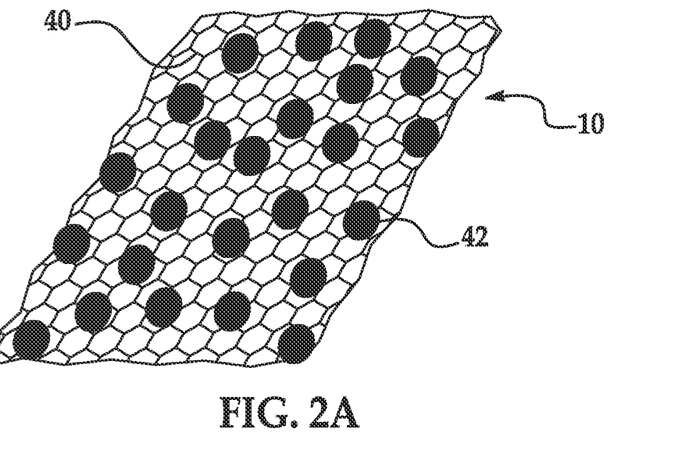
FIG. 2A is a schematic, perspective view of an example of the active electrode material including a graphene layer and nanoparticles deposited thereon.

As shown in FIG. 2A, the material 10 includes the layer of graphene 40 having silicon nanoparticles 42 attached to surface(s) and/or edge(s) thereof. The nanoparticles 42 are not encapsulated by the graphene layer 40. In other words, multiple sheets of graphene do not surround the silicon nanoparticles. Furthermore, the graphene layer 40 has a relatively large surface area upon which the silicon can deposit. The surface area of the graphene layer 40 may range from about 100 m²/g to about 2000 m²/g, and the silicon loading may be significantly increased when a layer 40 with a higher surface area is formed and when larger amounts of the silicon active material precursor are used.

It is to be understood that this example may begin with the tin active material precursor 16 and/or the aluminum active material precursor 18 in addition to the silicon active material precursor 14 and the graphene active material precursor 20. In this particular example, each active material precursor 14, 16, 18 may be introduced into a respective carrier gas 24. The independent steams of carrier gas 24 and precursor 14, 16, or 18 are then delivered to the plasma chamber 30, where they are mixed and are also combined with the graphene active material precursor 20. When tin is utilized, a ratio of the silicon active material precursor 14 to the tin active material precursor 16 ranges from about 2:8 to about 8:2, and when aluminum is utilized, the amount of the aluminum active material precursor 18 ranges from about 5 atomic % to about 20 atomic %.

When exposed to the plasma flame 32, graphene and vapor(s) with elemental silicon and vapor(s) with elemental tin and/or vapor(s) with elemental aluminum will be formed from the respective precursors 20, 14, and 16 and/or 18. Then when exposed to the lower temperature at the quenching area 36 and within the cooling train 38, the elemental silicon and the elemental tin and/or elemental aluminum will deposit onto the surface(s) and/or edge(s) of the graphene. The tin tends to form Ti—C bonds and the aluminum tends to form Al—C bonds with the graphene surface(s) and/or edge(s). The elemental silicon and elemental tin and/or elemental aluminum deposited on the graphene each act as nuclei that spontaneously grow into nanoparticles having an average size ranging from about 1 nm to about 100 nm. The material formed from this method is similar to material 10 shown in FIG. 2A, except that the nanoparticles 42 will include silicon nanoparticles and tin nanoparticles, silicon nanoparticles and aluminum nanoparticles, or silicon nanoparticles, tin nanoparticles, and aluminum nanoparticles.

The size of the formed nanoparticles 42 may be controlled, at least in part, by controlling the carrier gas flow and the amount of precursor 14, 16, 18 that is used.

When the silicon active material precursor 14 is used in combination with the tin active material precursor 16 and/or the aluminum active material precursor 18 (i.e., without the graphene active material precursor 20), the vapor(s) formed in the plasma flame 32 will include silicon and tin, silicon and aluminum, or silicon, tin, and aluminum. When exposed to the lower temperature at the quenching area 36 and within the cooling train 38, the elements present in the vapor(s) will mix together to form an alloy, in which the elements are phase separated. This example of the method forms the material 10', an example of which is depicted in FIG. 2B.

Figure 2B:
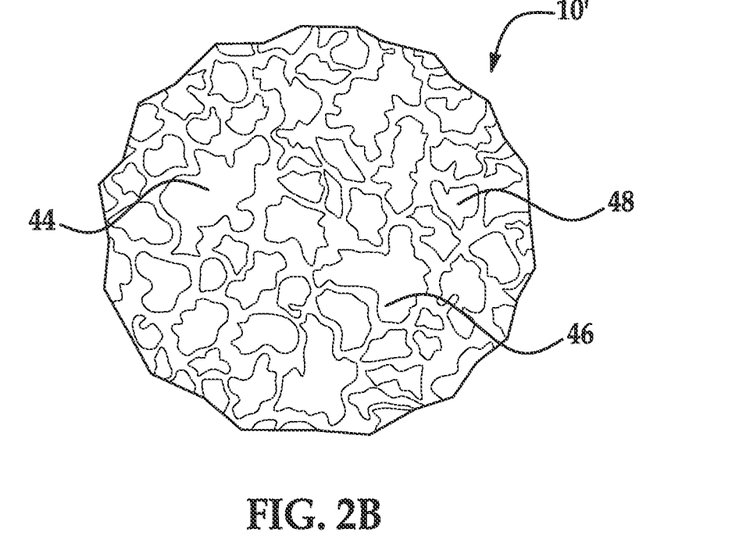
FIG. 2B is a schematic, top view is another example of the active electrode material including an alloy of phase separated silicon, tin, and aluminum.

As shown in FIG. 2B, the material 10' includes phase separated silicon 44, tin 46, and aluminum 48. In an example, the phases include, respectively, nano-scale sized silicon particles, nano-scale sized tin particles, and nano-scale sized aluminum particles. As mentioned above, other examples of the material 10' may include phase separated silicon 44 and tin 46 (with each phase including nano-scale sized particles), or phase separated silicon 44 and aluminum 48 (with each phase including nano-scale sized particles).

It is to be understood that the tin 46 and aluminum 48 are electrically conductive, which enables electrons to reach the silicon phase 44 which can hold an abundance of lithium ions. As such, each of the three phases 44, 46, 48 contributes to the insertion and extraction of lithium ions. Furthermore, the diffusion of lithium in tin and aluminum is much faster than in silicon. This can reduce the concentration gradient of lithium ions through any larger composite particles of silicon, tin, and aluminum (e.g., those particles having a size above 100 nm and up to several microns), in effect reducing the diffusion induced stress to mitigate the fracture of these larger composite particles. Still further, if a crack is generated in the alloy material 10', the relatively soft phases of aluminum and/or tin tend to absorb the elastic strain energy and prevent any micro-cracks from propagating. Yet further, the immiscible characteristics of silicon 44, aluminum 48, and tin 46 minimizes electrochemical sintering and thus prevents coalescence of the particles that may otherwise lead to rapid mechanical degradation of the electrode material 10'.

The material 10' may also be exposed to air for a predetermined amount of time to form a thin layer of oxide on the surface. In an example, it is desirable that the aluminum oxidize to form the thin layer of oxide. The resulting oxide layer may function as an artificial solid electrolyte interphase (SEI) layer that can prevent electrolyte decomposition when exposed to low voltage potential. In theory, this artificial SEI layer covers the material surface and blocks electrons from diffusing out of the negative electrode (which is made of or includes the material 10'), which would otherwise inevitably consume the electrolyte by electrochemical reduction. Furthermore, the artificial SEI layer can impart kinetic stability to the electrolyte against further reductions in subsequent cycles. The artificial SEI facilitates charge transfer to the material 10' and is also ionically conducting, and thus allows lithium ions to travel across. Overall, the artificial SEI should contribute to good cycling of the battery.

When it is desirable to form a graphene layer 40 with a layer of the material 10' thereon, in one example, two cycles of plasma vaporization are performed. In the first cycle, the graphene active material precursor 20 (in this example graphene oxide) is used. A carrier gas 24 may be delivered to the plasma chamber 30 through gas delivery mechanism 22'''. In the plasma chamber 30, the carrier gas 24 is mixed with the graphene active material precursor 20. When exposed to the plasma flame 32, graphene will be formed as a result of reduction of the graphene oxide precursor 20. The formed graphene will be accelerated through the quenching area 36 and the cooling train 38 and deposited on a substrate 51.

In the second cycle, the silicon active material precursor 14 is used in combination with the tin active material precursor 16 and/or the aluminum active material precursor 18 (i.e., without the graphene active material precursor 20). The vapor(s) formed in the plasma flame 32 will include silicon and tin, silicon and aluminum, or silicon, tin, and aluminum. When exposed to the lower temperature at the quenching area 36 and within the cooling train 38, the elements present in the vapor(s) will mix together to form an alloy, in which the elements are phase separated. The alloy will be deposited on the previously formed layer of graphene to form the material 10'' shown in FIG. 2C.

Figure 2C:
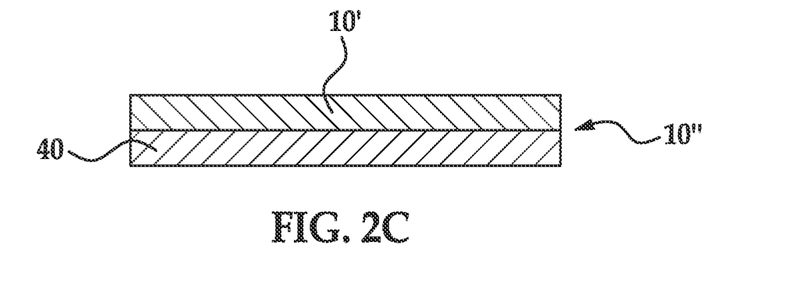
FIG. 2C is a cross-sectional view of yet another example of the active electrode material including a graphene layer and an alloy deposited thereon, the alloy including phase separated silicon, tin, and aluminum.

Alternatively, the formation of the material 10'' may take place in a single step. In this example, all of the precursors 14, 16, 18, 20 (in this example, the graphene active material precursor 20 is the graphene powder) may be introduced together. The phase separated alloy that is formed within the quenching area 36 and cooling train 38 will also deposit on the already formed graphene.

As shown in FIG. 2C, the material 10'' includes the layer of graphene 40 with the material 10' deposited thereon. The layer of material 10' includes phase separated silicon, tin, and aluminum as previously described in reference to FIG. 2B. The material 10'' may be exposed to air in order to form the oxide layer on the exposed surface(s) of the layer of material 10'.

The material 10'' is shown as a continuous film of the two layers 40, 10'. It is to be understood however, that the material 10'' may be in the form of particles as well.

Referring back to FIG. 1, the pressure within the system 100 accelerates the material 10, 10', 10'' through the cooling train 38 and toward a substrate 51. The material 10, 10', 10'' deposits on the substrate 51. The substrate 51 may be a surface of the system 100, or may be a negative-side current collector 56 that is positioned within the system so that the material 10, 10' 10'' is deposited on a surface thereof.

When the material 10, 10', 10'' is deposited on the surface of the system 100, the deposited material 10, 10', 10'' may be in the form of a powder on the surface. The powder may be collected and used as an active material in a negative electrode. As an example, the collected material 10, 10', 10'' may be dispersed with a conductive carbon and a polymer binder at a certain ratio into an organic solvent or water. The dispersion may be mixed to obtain a homogeneous solution. The solution may then be doctor blade coated (or otherwise deposited, cast, etc.) onto a negative-side current collector (e.g., copper) and dried to form the negative electrode.

The polymer binder may be included to structurally hold the material 10, 10', 10'' together. Example binders include polyvinylidene fluoride (PVdF), an ethylene propylene diene monomer (EPDM) rubber, sodium alginate, carboxymethyl cellulose (CMC), styrene-butadiene rubber (SBR), polyacrylic acid (PAA), or polyimide (PI). The conductive carbon may be included to ensure electron conduction between the material 10, 10', 10'' and, for example, the negative-side current collector 56. The conductive carbon may be a high surface area carbon, such as acetylene black.

In this example of the negative electrode, the material 10, 10', 10'' may make up to 90% by weight (i.e., 90 wt %) of the total weight of the negative electrode. In an example, the negative electrode includes about 70 wt % of the material 10, 10', 10'', about 15 wt % of the conductive carbon, and about 15 wt % of the polymer binder.

When the material 10, 10', 10'' is deposited directly on the current collector, the negative electrode forms as a result of the plasma vaporization process. In these examples, the material 10, 10', 10'' is the negative electrode, and thus the negative electrode does not include any other materials, such as the conductive carbon or the polymer binder.

Figure 3:
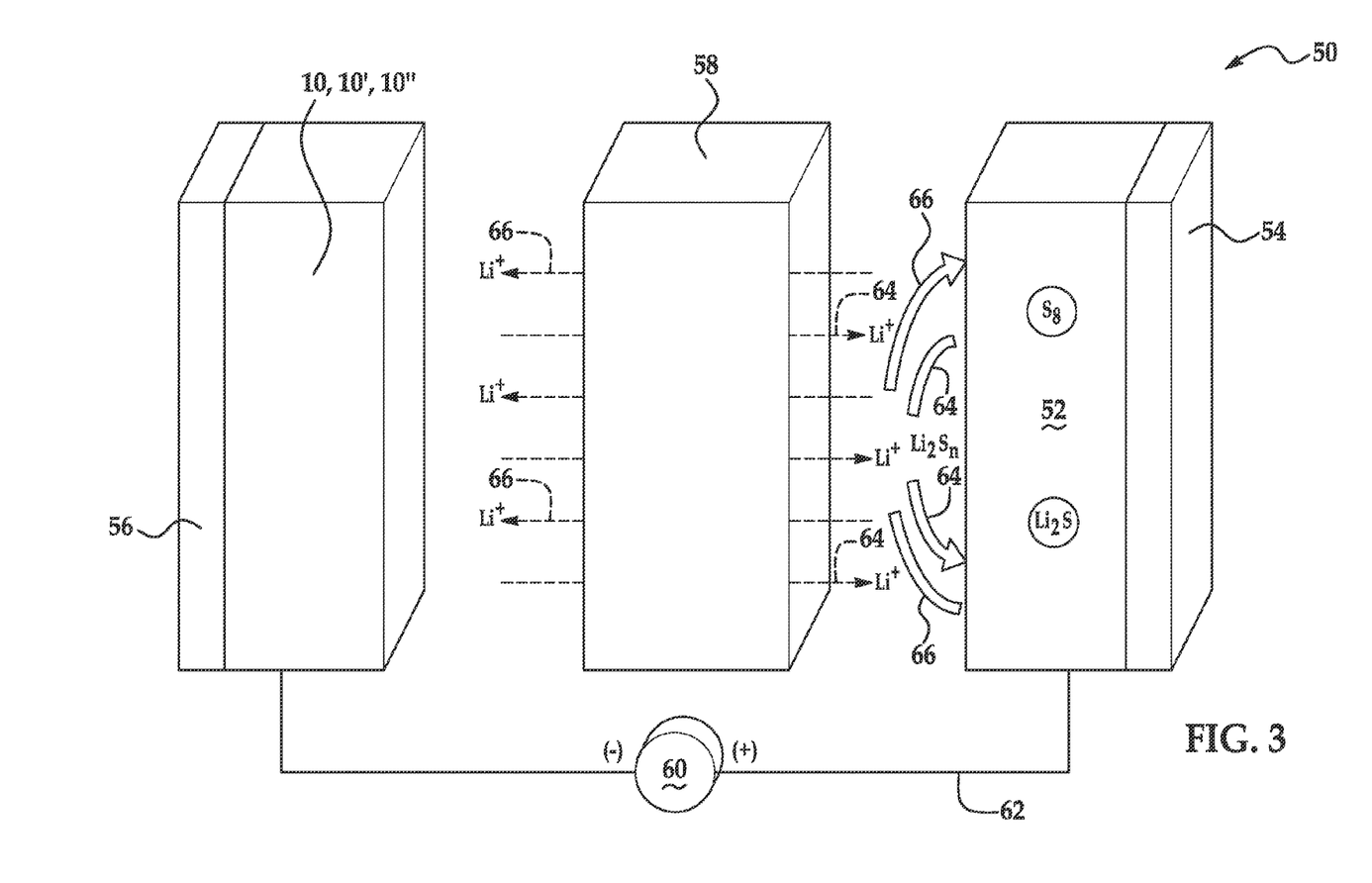
FIG. 3 is a schematic, perspective view of an example of a lithium-sulfur battery showing a charging and discharging state.
Figure 4:
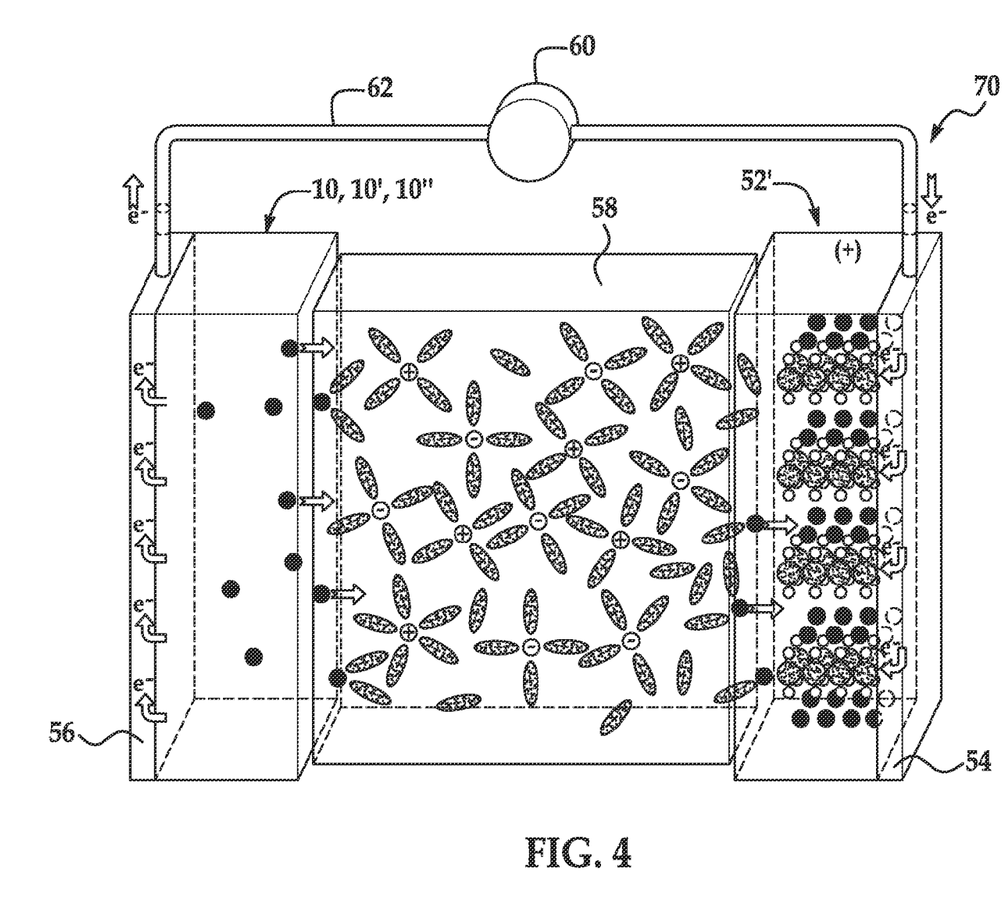
FIG. 4 is a schematic, perspective view of an example of a lithium ion battery.

In light of the previous discussion, the active electrode material 10, 10', 10'' may be used as part of the negative electrode or as the negative electrode in a lithium-sulfur battery 50 (FIG. 3) or a lithium ion battery 70 (FIG. 4).

Prior to being used in the lithium-sulfur battery 50 or the lithium ion battery 70, the examples of the negative electrode disclosed herein may be pre-lithiated. Pre-lithiation may be particularly desirable when the negative electrode is to be used in the lithium-sulfur battery 50.

In an example, the negative electrode is pre-lithiated using a lithium-silicon (Li—Si) half cell method. More specifically, the Li—Si half cell is assembled using the silicon-based negative electrode (which includes or is the material 10, 10', 10'' as previously described). The Li—Si half cell is soaked in a pre-lithiation electrolyte. Examples of the pre-lithiation electrolyte include a lithium salt dissolved in a solvent or solvent mixture. A voltage potential is applied to the half cell, which causes at least some component in the electrolyte to decompose. The decomposition product deposits on the exposed surface(s) of the negative electrode to form a SEI layer. The decomposition product may be LiF, $Li_2CO_3$, $Li_xPF_yO_z$, F-replaced Lithium Ethylene Di Carbonate (F-LEDC), an unsaturated polyolefin, etc. The voltage potential is applied for a time sufficient to form the SEI layer. In an example, when a higher current is used, the exposure time may be shorter. Similarly, when a lower current is used, the exposure time may be longer. The SEI layer may have a thickness of about 10 nm or less. It is to be understood that if the artificial SEI layer is formed on the material 10', the formation of a natural SEI layer during pre-lithiation may not take place.

In another example, the negative electrode (which includes or is the material 10, 10', 10'') may be pre-lithiated by short circuiting lithium-silicon having the previously described pre-lithiation electrolyte positioned therebetween. This may be accomplished for a time period ranging from about 1 hour to about 24 hours.

During pre-lithiation, lithium ions are dissolved (or de-plated) from lithium metal and are alloyed with silicon (in the material 10, 10', 10'') by an electroformation reaction with the pre-lithiation electrolyte (which can conduct the lithium ions). The lithium ions can alloy with the silicon-based active material 10, 10', 10", thereby lithiating the negative electrode 12.

When pre-lithiation is complete, the lithiated negative electrode may be rinsed to remove any remaining pre-lithiation electrolyte, and then may be used in either the silicon-sulfur battery 50 (FIG. 3) or the lithium ion battery 70 (FIG. 4).

Referring now to FIG. 3, an example of the lithium-sulfur battery 50 including the material 10, 10', 10" as the anode/negative electrode formed on the negative-side current collector 56 is depicted. While not shown, it is to be understood that the artificial SEI or the SEI resulting from pre-lithiation may be present on the surface of the negative electrode 10, 10', 10".

The battery 50 generally includes the negative electrode 10, 10', 10", a cathode/positive electrode 52, and a porous polymer separator 58. The lithium-sulfur battery 50 also includes an interruptible external circuit 62 that connects the negative electrode 10, 10', 10" and the positive electrode 52. Each of the negative electrode 10, 10', 10", the positive electrode 52, and the porous polymer separator 58 are soaked in an electrolyte solution (not shown) that is capable of conducting lithium ions.

The porous polymer separator 58, which operates as both an electrical insulator and a mechanical support, is sandwiched between the negative electrode 10, 10', 10" and the positive electrode 52 to prevent physical contact between the two electrodes 10, 10', 10" and 52, and to prevent the occurrence of a short circuit. The porous polymer separator 58, in addition to providing a physical barrier between the two electrodes 10, 10', 10" and 52, ensures passage of lithium ions (identified by the Li$^+$) and some related anions through the electrolyte solution filling its pores.

The porous polymer separator 58 may be formed of a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer membranes include single layer polypropylene membranes, such as CELGARD 2400 and CELGARD 2500 from Celgard, LLC (Charlotte, N.C.). It is to be understood that the membrane may be uncoated or untreated. For example, the membrane may not include any surfactant treatment thereon. In other examples, the membrane may be treated with a surfactant.

The porous polymer separator 58 may also be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the separator 58 is poly(p-hydroxybenzoic acid). In yet another example, the porous polymer separator 58 may be chosen from a combination of the polyolefin (such as PE and/or PP) and one or more of the polymers for the membrane listed above.

Still other suitable porous polymer separators 58 include those that have a ceramic layer attached thereto, and those that have ceramic filler in the polymer matrix (i.e., an organic-inorganic composite matrix).

The porous polymer separator 58 may be a single layer or may be a multi-layer (e.g., bilayer, trilayer, etc.) laminate fabricated from either a dry or wet process. In some instances, the separator 58 may include fibrous layer(s) to impart appropriate structural and porosity characteristics.

As mentioned above, the negative electrode is or includes the material 10, 10', 10" formed by the plasma vaporization process disclosed herein. In the example shown in FIG. 3, the negative electrode 10, 10', 10" is formed on the negative-side current collector 56. The negative-side current collector 56 may be formed from copper or any other appropriate electrically conductive material known to skilled artisans. The negative-side current collector 56 collects and moves free electrons to and from the external circuit 62.

The positive electrode 52 of the lithium-sulfur battery 50 may be formed from any sulfur-based active material that can sufficiently undergo lithiation and delithiation. Examples of sulfur-based active materials include $S_8$, $Li_2S_8$, $Li_2S_6$, $Li_2S_4$, $Li_2S_2$, and $Li_2S$. The positive electrode 52 may be encapsulated with carbon and may also include a polymer binder material to structurally hold the sulfur-based active material together. The polymeric binder may be made of at least one of polyvinylidene fluoride (PVdF), polyethylene oxide (PEO), an ethylene propylene diene monomer (EPDM) rubber, or carboxymethyl cellulose (CMC)). A positive-side current collector 54 may be formed from aluminum or any other appropriate electrically conductive material known to skilled artisans. The positive-side current collector 54 collects and moves free electrons to and from the external circuit 62.

Any appropriate electrolyte solution (not shown) that can conduct lithium ions between the negative electrode 10, 10', 10" and the positive electrode 52 may be used in the lithium-sulfur battery 50. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in ether to form the non-aqueous liquid electrolyte solution include $LiClO_4$, $LiAlCl_4$, LiI, LiBr, LiSCN, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The lithium-sulfur battery 50 may support a load device 60 that can be operatively connected to the external circuit 62. The load device 60 may be powered fully or partially by the electric current passing through the external circuit 62 when the lithium-sulfur battery 50 is discharging. While the load device 60 may be any number of known electrically-powered devices, a few specific examples of a power-consuming load device include an electric motor for a hybrid vehicle or an all-electrical vehicle, a laptop computer, a cellular phone, and a cordless power tool. The load device 60 may also, however, be a power-generating apparatus that charges the lithium-sulfur battery 50 for purposes of storing energy. For instance, the tendency of windmills and solar panels to variably and/or intermittently generate electricity often results in a need to store surplus energy for later use.

The lithium-sulfur battery 50 can include a wide range of other components that, while not depicted here, are nonetheless known to skilled artisans. For instance, the lithium-sulfur battery 50 may include a casing, gaskets, terminals, tabs, and any other desirable components or materials that may be situated between or around the negative electrode 10, 10', 10" and the positive electrode 52 for performance-related or other practical purposes. Moreover, the size and shape of the lithium-sulfur battery 50, as well as the design and chemical make-up of its main components, may vary depending on the particular application for which it is designed. Battery-powered automobiles and hand-held consumer electronic devices, for example, are two instances where the lithium-sulfur battery 50 would most likely be designed to different size, capacity, and power-output specifications. The lithium-sulfur battery 50 may also be connected in series and/or in parallel with other similar lithium-sulfur batteries 40 to produce a greater voltage output and current (if arranged in parallel) or voltage (if arranged in series) if the load device 60 so requires.

The lithium-sulfur battery 50 can generate a useful electric current during battery discharge (shown by reference numeral 64 in FIG. 3). During discharge, the chemical processes in the battery 50 include lithium ($Li^+$) dissolution from the surface of the negative electrode 10, 10', 10" and incorporation of the lithium cations into alkali metal polysulfide salts (i.e., $Li_2S$). As such, polysulfides are formed (sulfur is reduced) on the surface of the positive electrode 52 in sequence while the battery 50 is discharging. The chemical potential difference between the positive electrode 52 and the negative electrode 10, 10', 10" (ranging from approximately 1.5 to 3.0 volts, depending on the exact chemical make-up of the electrodes 10, 10', 10" and 52) drives electrons produced by the dissolution of lithium at the negative electrode 10, 10', 10" through the external circuit 62 towards the positive electrode 52. The resulting electric current passing through the external circuit 62 can be harnessed and directed through the load device 60 until the lithium in the negative electrode 10, 10', 10" is depleted and the capacity of the lithium-sulfur battery 50 is diminished.

The lithium-sulfur battery 50 can be charged or re-powered at any time by applying an external power source to the lithium-sulfur battery 50 to reverse the electrochemical reactions that occur during battery discharge. During charging (shown at reference numeral 66 in FIG. 3), lithium plating to the negative electrode 10, 10', 10" takes place and sulfur formation at the positive electrode 52 takes place. The connection of an external power source to the lithium-sulfur battery 50 compels the otherwise non-spontaneous oxidation of lithium at the positive electrode 52 to produce electrons and lithium ions. The electrons, which flow back towards the anode 12 through the external circuit 44, and the lithium ions ($Li^+$), which are carried by the electrolyte across the porous polymer separator 58 back towards the negative electrode 10, 10', 10", reunite at the negative electrode 10, 10', 10" and replenish it with lithium for consumption during the next battery discharge cycle. The external power source that may be used to charge the lithium-sulfur battery 50 may vary depending on the size, construction, and particular end-use of the lithium-sulfur battery 50. Some suitable external power sources include a battery charger plugged into an AC wall outlet and a motor vehicle alternator.

Referring now to FIG. 4, an example of the lithium ion battery 70 including the material 10, 10', 10" as the anode/negative electrode formed on the negative-side current collector 56 is depicted. While not shown, it is to be understood that the artificial SEI or the SEI resulting from pre-lithiation may be present on the surface of the negative electrode 10, 10', 10".

The battery 70 generally includes the negative electrode 10, 10', 10", a cathode/positive electrode 52', and the porous polymer separator 58. The lithium ion battery 70 also includes an interruptible external circuit 62 that connects the negative electrode 10, 10', 10" and the positive electrode 52'. Each of the negative electrode 10, 10', 10", the positive electrode 52', and the porous polymer separator 58 are soaked in an electrolyte solution (not shown) that is capable of conducting lithium ions.

When used in the lithium ion battery 70, the silicon-based negative electrode (formed of or including the material 10, 10', 10") disclosed herein may be paired with the positive electrode 52', which is formed from any lithium-based active material that can sufficiently undergo lithium insertion and deinsertion. One common class of known lithium-based active materials suitable for the positive electrode 52' includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). Other lithium-based active materials may also be utilized, such as lithium nickel-cobalt oxide ($LiNi_xCo_{1-x}O_2$), aluminum stabilized lithium manganese oxide spinel ($Li_xMn_{2-x}Al_yO_4$), and lithium vanadium oxide ($LiV_2O_5$).

The lithium-based active material of the positive electrode 52' may be intermingled with a polymeric binder and a high surface area carbon. Suitable binders include polyvinylidene fluoride (PVdF), an ethylene propylene diene monomer (EPDM) rubber, and/or carboxymethyl cellulose (CMC)). The polymeric binder structurally holds the lithium-based active materials and the high surface area carbon together. An example of the high surface area carbon is acetylene black. The high surface area carbon ensures electron conduction between a positive-side current collector 54 (e.g., aluminum) and the active material particles of the positive electrode 52'.

The porous polymer separator 58, which operates as both an electrical insulator and a mechanical support, is sandwiched between the negative electrode 10, 10', 10" and the positive electrode 52' to prevent physical contact between the two electrodes 10, 10', 10" and 52' and the occurrence of a short circuit. In addition to providing a physical barrier between the two electrodes 10, 10', 10" and 52', the porous polymer separator 58 ensures passage of lithium ions (identified by the black dots and by the open circles having a (+) charge in FIG. 4) and related anions (identified by the open circles having a (−) charge in FIG. 4) through an electrolyte solution filling its pores. This helps ensure that the lithium ion battery 70 functions properly.

The porous polymer separator 58 for the lithium ion battery 70 may be selected from any of the examples previously provided for the lithium-sulfur battery 50.

Any appropriate electrolyte solution that can conduct lithium ions between the negative electrode 10, 10', 10" and the positive electrode 22' may be used in the lithium ion battery 70. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 70 as well as how to manufacture or commercially acquire them. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(FSO_2)_2$, $LiN(CF_3SO_2)_2$, $LiAsF_6$, $LiPF_6$, and mixtures thereof. These and other similar lithium salts may be dissolved in a variety of organic solvents, such as cyclic carbonates (ethylene carbonate, propylene carbonate, butylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIG. 4, the lithium ion battery 70 also includes an interruptible external circuit 62 that connects the negative electrode 10, 10', 10" and the positive electrode 52'. The lithium ion battery 70 may also support a load device 60 that can be operatively connected to the external circuit 62. The load device 60 receives a feed of electrical energy from the electric current passing through the external circuit 62 when the lithium ion battery 70 is discharging. While the load device 60 may be any number of known electrically-powered devices, a few specific examples of a power-consuming load device 60 include an electric motor for a hybrid vehicle or an all-electrical vehicle, a laptop computer, a cellular phone, and a cordless power tool. The load device 60 may also, however, be an electrical power-generating apparatus that charges the lithium ion battery 70 for purposes of storing energy. For instance, the tendency of windmills and solar panels to variably and/or intermittently generate electricity often results in a need to store surplus energy for later use.

The lithium ion battery 70 may also include a wide range of other components that, while not depicted here, are nonetheless known to skilled artisans. For instance, the lithium ion battery 70 may include a casing, gaskets, terminals, tabs, and any other desirable components or materials that may be situated between or around the negative electrode 10, 10', 10" and the positive electrode 52' for performance-related or other practical purposes. Moreover, the size and shape of the lithium ion battery 70, as well as the design and chemical make-up of its main components, may vary depending on the particular application for which it is designed. Battery-powered automobiles and hand-held consumer electronic devices, for example, are two instances where the lithium ion battery 70 would most likely be designed to different size, capacity, and power-output specifications. The lithium ion battery 70 may also be connected in series and/or in parallel with other similar lithium ion batteries to produce a greater voltage output and current (if arranged in parallel) or voltage (if arranged in series) if the load device 60 so requires.

The lithium ion battery 70 generally operates by reversibly passing lithium ions between the negative electrode 10, 10', 10" and the positive electrode 52'. In the fully charged state, the voltage of the battery 70 is at a maximum (typically in the range 3.0 to 5.0V); while in the fully discharged state, the voltage of the battery 70 is at a minimum (typically in the range 1.0 to 3.0V). Essentially, the Fermi energy levels of the active materials in the positive and negative electrodes 52' and 10, 10', 10" change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 60 enables an electronic current flow in the external circuit 62 with a direction such that the difference between the Fermi levels (and, correspondingly, the cell voltage) decreases. The reverse happens during battery charging: the battery charger forces an electronic current flow in the external circuit 62 with a direction such that the difference between the Fermi levels (and, correspondingly, the cell voltage) increases.

At the beginning of a discharge, the negative electrode 10, 10', 10" of the lithium ion battery 70 contains a high concentration of intercalated lithium while the positive electrode 52' is relatively depleted. When the negative electrode 10, 10', 10" contains a sufficiently higher relative quantity of intercalated lithium, the lithium ion battery 70 can generate a beneficial electric current by way of reversible electrochemical reactions that occur when the external circuit 62 is closed to connect the negative electrode 10, 10', 10" and the positive electrode 62. The establishment of the closed external circuit under such circumstances causes the extraction of intercalated lithium from the negative electrode 10, 10', 10". The extracted lithium atoms are split into lithium ions (identified by the black dots and by the open circles having a (+) charge) and electrons (e) as they leave an intercalation host at the negative electrode-electrolyte interface.

The chemical potential difference between the positive electrode 52' and the negative electrode 10, 10', 10" (ranging from about 3.0 volts to about 5.0 volts, depending on the exact chemical make-up of the electrodes 10, 10', 10" and 52') drives the electrons (e) produced by the oxidation of intercalated lithium at the negative electrode 10, 10', 10" through the external circuit 62 towards the positive electrode 52'. The lithium ions are concurrently carried by the electrolyte solution through the porous polymer separator 58 towards the positive electrode 52'. The electrons (e) flowing through the external circuit 62 and the lithium ions migrating across the porous polymer separator 58 in the electrolyte solution eventually reconcile and form intercalated lithium at the positive electrode 52'. The electric current passing through the external circuit 62 can be harnessed and directed through the load device 60 until the level of intercalated lithium in the negative electrode 10, 10', 10" falls below a workable level or the need for electrical energy ceases.

The lithium ion battery 70 may be recharged after a partial or full discharge of its available capacity. To charge the lithium ion battery 70, an external battery charger is connected to the positive and the negative electrodes 52' and 10, 10', 10" to drive the reverse of battery discharge electrochemical reactions. During recharging, the electrons (e) flow back towards the negative electrode 10, 10', 10" through the external circuit 62, and the lithium ions are carried by the electrolyte across the porous polymer separator 58 back towards the negative electrode 10, 10', 10". The electrons (e) and the lithium ions are reunited at the negative electrode 10, 10', 10", thus replenishing it with intercalated lithium for consumption during the next battery discharge cycle.

The external battery charger that may be used to charge the lithium ion battery 70 may vary depending on the size, construction, and particular end-use of the lithium ion battery 70. Some suitable external battery chargers include a battery charger plugged into an AC wall outlet and a motor vehicle alternator.

To further illustrate the present disclosure, an example is given herein. It is to be understood that this example is provided for illustrative purposes and is not to be construed as limiting the scope of the disclosure.

EXAMPLE

A phase separated silicon, tin, and aluminum alloy (SiSnAl alloy) was directly deposited on a copper current collector using a magnetron sputtering deposition system. The atomic ratio of the elements was Si/Sn/Al is 2:1:1. The SiSnAl alloy on the current collector was used as a negative electrode and assembled into a coin cell with Li metal as the counter electrode. The electrolyte solution in the coin cell was 1 M $LiPF_6$ ethylene carbonate and dimethyl carbonate (1:1 v/v) with 10% of fluoroethylene carbonate additive. The cycling was conducted at 25° C.

Figure 5:
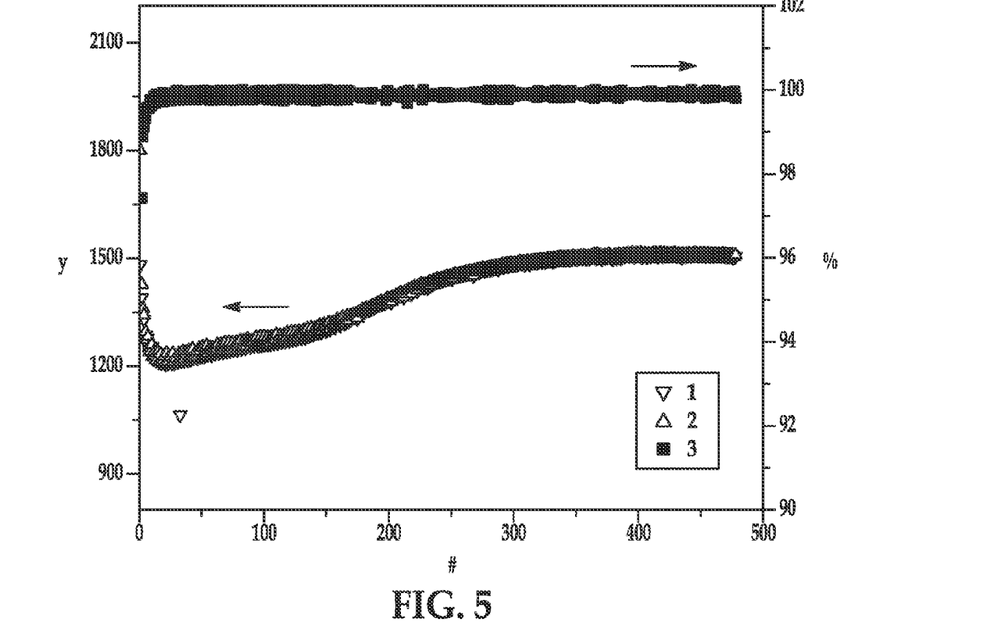
FIG. 5 is a graph illustrating the specific deep charge and discharge capacity (mAh/g, left Y-axis) vs. cycle number and the coulombic efficiency (%, right Y-axis) vs. cycle number for a coin cell with an example of a negative electrode made of an alloy with phase separated silicon, tin, and aluminum.

The coin cell was cycled with a cut-off voltage between 0.05 V and 1.5 V vs. Li/Li+. The cycle efficiency (3), specific charge capacity (1), and specific discharge capacity (2) results are shown in FIG. 5. In FIG. 5, the left Y axis, labeled "Y", represents the specific capacity (mAh/g), the right Y axis, labeled "%", represents the coulombic efficiency (%), and the X axis, labeled "#" represents the cycle number.

Figure 6:
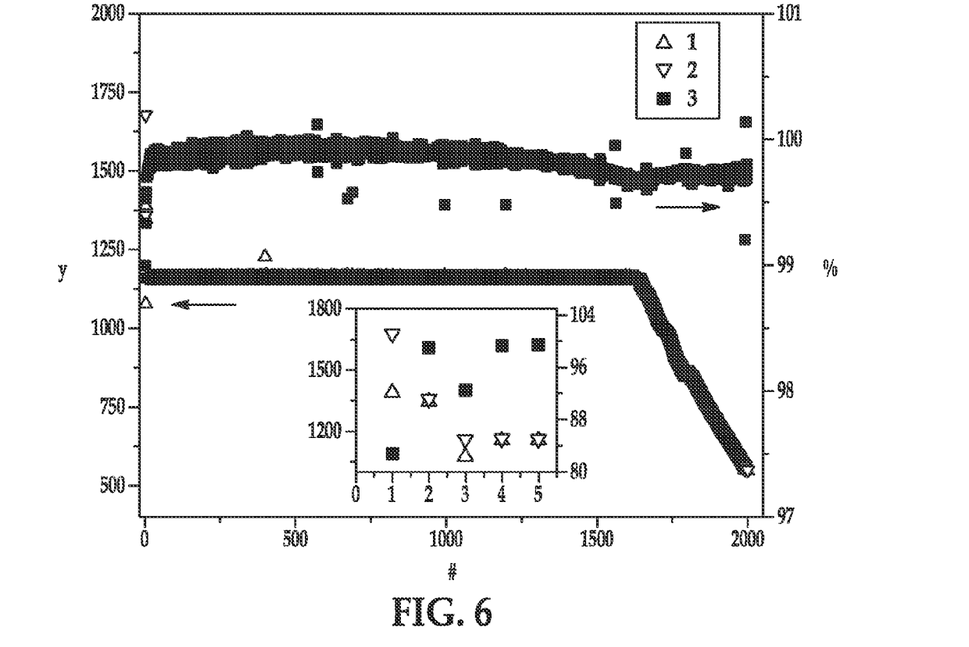
FIG. 6 is a graph illustrating the specific charge and discharge capacity (mAh/g, left Y-axis) vs. cycle number and the coulombic efficiency (%, right Y-axis) vs. cycle number for the coin cell with the example of the negative electrode made of the alloy with phase separated silicon, tin, and aluminum.

The same coin cell was cycled with a different protocol. In particular, the cycle was controlled by capacity and voltage (1150 mAh/g and 0.05 V at lower cutoff voltage). For example, one discharge cycle stopped if the capacity limit reached 1150 mAh/g or if the voltage reached 0.05 V. The cycle efficiency (3), specific charge capacity (1), and specific discharge capacity (2) results for this cycling protocol are shown in FIG. 6. In FIG. 6, the left Y axis, labeled "Y", represents the specific capacity (mAh/g), the right Y axis, labeled "%", represents the coulombic efficiency (%), and the X axis, labeled "#" represents the cycle number. The inset graph shows the performance of the first few cycles.

Overall, the results shown in FIGS. 5 and 6 illustrate good cycle efficiency and charge and discharge capacity, especially compared with a pure silicon electrode, which has shown to lose most of its capacity after 100 cycles.

It is to be understood that the ranges provided herein include the stated range and any value or sub-range within the stated range. For example, a range of about 1 nm to about 100 nm should be interpreted to include not only the explicitly recited limits of about 1 nm to about 100 nm, but also to include individual values, such as 25 nm, 42 nm, 90.5 nm, etc., and sub-ranges, such as from about 5 nm to about 75 nm; from about 20 nm to about 55 nm, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for making a silicon-based active electrode material, the method comprising:
    introducing a silicon active material precursor to a carrier gas;
    prior to, simultaneously with, or subsequent to the introduction of the silicon active material precursor to the carrier gas, introducing a graphene active material precursor to the carrier gas;
    prior to, simultaneously with, or subsequent to the introduction of the silicon active material precursor to the carrier gas, introducing an other active material precursor to the carrier gas, the other active material precursor being selected from a group consisting of a tin active material precursor, an aluminum active material precursor, and combinations thereof; and
    exposing the carrier gas containing any of the silicon active material precursor, the graphene active material precursor, the other active material precursor, or combinations thereof to plasma vaporization, thereby forming a material including a graphene layer having an alloy of phase separated i) silicon and ii) tin, aluminum, or tin and aluminum deposited on a surface thereof.

2. The method as defined in claim 1, further comprising depositing the material directly on a current collector.

3. The method as defined in claim 1 wherein the material is formed on a surface of a plasma vaporization system, and wherein the method further comprises:
    collecting the material; and
    mixing the material with a polymeric binder and a conductive carbon.

4. The method as defined in claim 1 wherein the silicon active material precursor is selected from a group consisting of 2,4,6,8,10-pentamethylcyclopentasiloxane, pentamethyldisilane, silicon tetrabromide, silicon tetrachloride, tetraethylsilane, 2,4,6,8-tetramethylcyclotetrasiloxane, and combinations thereof.

5. The method as defined in claim 1 wherein the tin active material precursor is selected from a group consisting of Bis[bis(trimethylsilyl)amino]tin(II); Dibutyldiphenyltin Hexaphenylditin(IV); Tetraallyltin; Tetrakis(diethylamido)tin(IV); Tetrakis(dimethylamido)tin(IV); Tetramethyltin; Tetravinyltin; Tin(II) acetylacetonate; Tricyclohexyltin hydride; Trimethyl(phenylethynyl)tin; Trimethyl(phenyl)tin; Tin chloride; and combinations thereof.

6. The method as defined in claim 1 wherein the aluminum active material precursor is selected from a group consisting of Aluminum tris(2,2,6,6-tetramethyl-3,5-heptanedionate), Triisobutylaluminum; Trimethylaluminum; Tris(dimethylamido)aluminum(III); and combinations thereof.

7. The method as defined in claim 1 wherein the graphene active material precursor is selected from a group consisting of a graphene powder, graphene oxide, and combinations thereof.

8. The method as defined in claim 1 wherein the carrier gas includes a combination of argon gas and hydrogen gas.

9. The method as defined in claim 1 wherein the other active material precursor includes the combination of the tin active material precursor and the aluminum active material precursor.

10. A method for making a silicon-based active electrode material, the method comprising:
introducing a silicon active material precursor to a carrier gas;
prior to, simultaneously with, or subsequent to the introduction of the silicon active material precursor to the carrier gas, introducing an other active material precursor to the carrier gas, the other active material precursor including a combination of a graphene active material precursor, a tin active material precursor, and an aluminum active material precursor, or a combination of a tin active material precursor and an aluminum active material precursor; and
exposing the carrier gas containing any of the silicon active material precursor, the other active material precursor, or combinations thereof to plasma vaporization, thereby forming a material including i) an alloy of phase separated silicon, tin and aluminum, or ii) a graphene layer having silicon nanoparticles, tin nanoparticles, and aluminum nanoparticles deposited on a surface thereof, or iii) a graphene layer having an alloy of phase separated silicon, tin and aluminum deposited on a surface thereof;
wherein a ratio of the silicon active material precursor to the tin active material precursor ranges from about 2:8 to about 8:2, and wherein an amount of the aluminum active material precursor ranges from about 5 atomic % to about 20 atomic %.

11. The method as defined in claim 9 wherein the alloy is of phase separated silicon, tin and aluminum, and wherein the method further comprises exposing the material including the alloy of phase separated silicon, tin and aluminum to air, thereby forming an oxide layer at a surface of the alloy.

12. A method for making a silicon-based active electrode material, the method comprising:
introducing a silicon active material precursor to a carrier gas;
prior to, simultaneously with, or subsequent to the introduction of the silicon active material precursor to the carrier gas, introducing an other active material precursor to the carrier gas, the other active material precursor including a tin active material precursor, an aluminum active material precursor, and a graphene active material precursor; and
exposing the carrier gas containing any of the silicon active material precursor, the other active material precursor, or combinations thereof to plasma vaporization, thereby forming a material including a graphene layer having an alloy of phase separated silicon, tin, and aluminum deposited on a surface thereof;
wherein:
the tin active material precursor is selected from a group consisting of Bis[bis(trimethylsilyl)amino]tin (II); Dibutyldiphenyltin Hexaphenylditin(IV); Tetraallyltin; Tetrakis(diethylamido)tin(IV); Tetrakis(dimethylamido)tin(IV); Tetramethyltin; Tetravinyltin; Tin(II) acetylacetonate; Tricyclohexyltin hydride; Trimethyl(phenylethynyl)tin; Trimethyl(phenyl)tin; Tin chloride; and combinations thereof;
the aluminum active material precursor is selected from a group consisting of Aluminum tris(2,2,6,6-tetramethyl-3,5-heptanedionate), Triisobutylaluminum; Trimethylaluminum; Tris(dimethylamido)aluminum (III); and combinations thereof; and
the graphene active material precursor is selected from a group consisting of a graphene powder, graphene oxide, and combinations thereof.

13. The method as defined in claim 1, further comprising controlling a temperature of plasma during plasma vaporization, wherein the temperature ranges from about 500° C. to about 5000° C.

14. A negative electrode active material, comprising:
a graphene layer; and
an alloy of phase separated silicon and tin, an alloy of phase separated silicon and aluminum, or an alloy phase separated silicon, tin and aluminum deposited on a surface of the graphene layer.

15. The negative electrode active material as defined in claim 14 wherein a ratio of the alloy to the graphene layer ranges from about 4:1 to about 1:1.

16. The method as defined in claim 1 wherein:
the graphene active material precursor is graphene oxide; and
the exposing of the carrier gas containing any of the silicon active material precursor, the graphene active material precursor, the other active material precursor, or combinations thereof to plasma vaporization includes:
a first cycle of plasma vaporization during which the carrier gas containing the graphene active material precursor is exposed to a plasma flame to form the graphene layer; and
a second cycle of plasma vaporization during which the carrier gas containing the silicon active material precursor and the other active material precursor is exposed to the plasma flame to form the alloy of phase separated i) silicon and ii) tin, aluminum, or tin and aluminum.

17. The method as defined in claim 1 wherein:
the graphene active material precursor is graphene powder; and
the exposing of the carrier gas containing any of the silicon active material precursor, the graphene active material precursor, the other active material precursor, or combinations thereof to plasma vaporization includes a single cycle of plasma vaporization during which the carrier gas containing the graphene active material precursor, the silicon active material precursor, and the other active material precursor is exposed to a plasma flame to form the graphene layer having the alloy of phase separated i) silicon and ii) tin, aluminum, or tin and aluminum deposited on the surface thereof.

* * * * *